H. Millard.

Sickle Grinder.

Nº 95,033.   Patented Sep. 21, 1869.

Witnesses.

Inventor.
A. Millard
PER Munn & Co.
Attorneys.

United States Patent Office.

HENRY MILLARD, OF YORK, NEW YORK.

Letters Patent No. 95,033, dated September 21, 1869.

---

IMPROVEMENT IN MACHINE FOR GRINDING MOWER AND REAPER-KNIVES.

---

The Schedule referred to in these Letters Patent and making part of the same.

---

To all whom it may concern:

Be it known that I, HENRY MILLARD, of York, in the county of Livingston, and State of New York, have invented a new and improved Sickle-Grinder; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish an improved machine for grinding mowing and reaping-machine cutters, which shall be simple in construction, easily operated, and so arranged that the cutters may be ground all the way from point to heel; and It consists in the construction and combination of the various parts of the machine, as hereinafter more fully described.

A is the frame of the machine, which is supported by the legs B, of such a length as to raise the machine to a convenient height.

Figure 1:
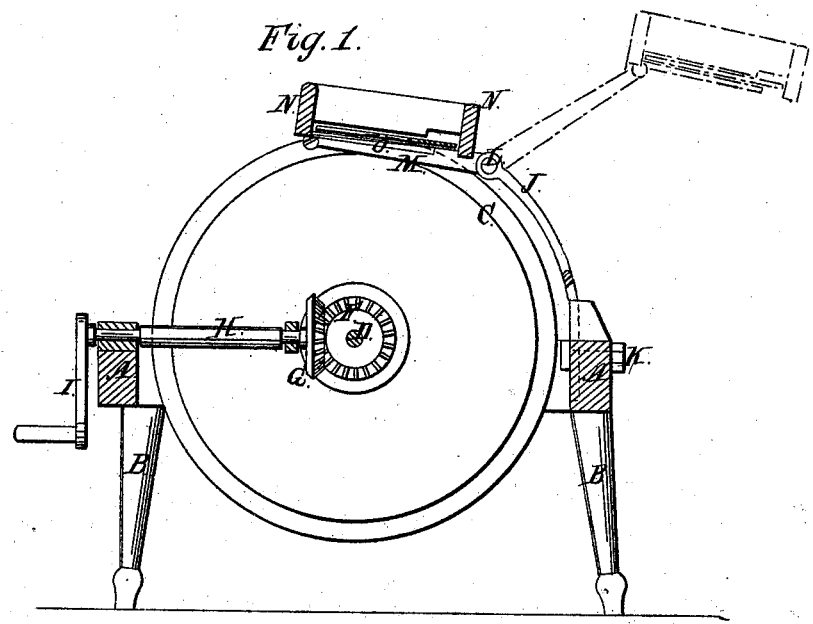
Figure 1 is a detail sectional view of my improved machine, taken through the line $x\ x$, fig. 2.
Figure 2:
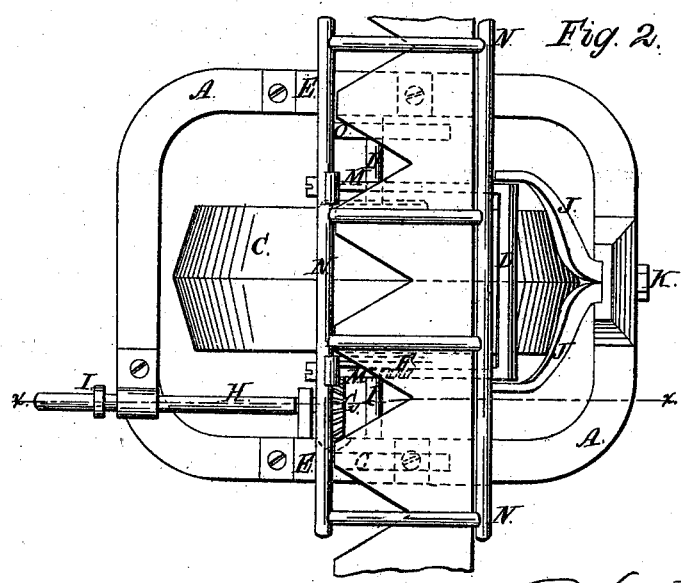
Figure 2 is a top view of the same.

C is the grindstone, the face of which is made angular, as shown in fig. 2, and which is securely attached to the shaft D, the journals of which revolve in bearings E, attached to the side bars of the frame A.

F is a small bevel-gear wheel, attached to the shaft D, into the teeth of which mesh the teeth of the bevel-gear wheel G, attached to the inner end of the shaft H, which revolves in bearings attached to the frame A, and to the outer end of which is attached the crank I, by means of which motion is given to the grindstone C.

This arrangement brings the crank I into such a position that it may be operated by the operator with one hand, while he holds the sickle upon the stone with the other hand.

J is an arm, the lower end of which is secured to the end bar of the frame A by a screw-bolt, K, passing through the said frame A and through a slot in the said arm J, so that the sickle-holder may be raised or lowered, to adjust it, as required.

The upper end of the arm J is branched, as shown in fig. 2, and to and between the ends of the said branches is pivoted the roller L.

M are two arms, the lower ends of which are rigidly attached to or formed solidly upon the roller L, at or near its ends.

To the upper ends of the arms M is hinged the frame N, in the lower part of which the cutters are placed to be ground, and by means of which the said cutters are held down squarely upon the grindstone to be ground.

The cutters are prevented from dropping out of the frame N, when the said frame is raised from the machine, by the arms O, one end of each of which is attached to the front side bar of the frame N, so as to pass beneath and support the cutters. This construction allows the frame N to be rocked, so that any desired part of the cutter-edges may be held against the surface of the stone.

By this construction the adjacent edges of two adjacent cutters are ground at the same time.

As the edges of the cutters are ground, the cutter-bar is moved longitudinally in the frame N to bring the edges of the next cutter into proper position to be ground.

Having thus described my invention,

What I claim as new, and desire to secure by Letters Patent is—

The slotted branched adjustable arm J, roller-bar and arms L M, and holder-frame N O, arranged, in relation to each other, and to the grindstone C and frame A, substantially as herein shown and described.

HENRY MILLARD.

Witnesses:
DANIEL L. SHULL,
DANIEL W. STEWART.